United States Patent [19]

Cipolla et al.

[11] Patent Number: 5,390,872
[45] Date of Patent: Feb. 21, 1995

[54] PACKAGE FOR ROLLS OF PHOTOSENSITIVE WEB

[75] Inventors: Thomas A. Cipolla, Rochester; Janis J. Ozols, Pittsford; Richard P. Garnsey, Fairport; Kathleen L. Myers; Howard D. Cook, both of Rochester; Andrea J. Tenny, Brockport; William S. Raymond; Michael L. Lucey, both of Rochester; Christopher K. Jestin, Baldwinsville, all of N.Y.

[73] Assignee: Eastman Kodak Company, Rochester, N.Y.

[21] Appl. No.: 129,889

[22] Filed: Sep. 30, 1993

[51] Int. Cl.⁶ .................. B65H 16/06; G03B 1/02
[52] U.S. Cl. .................. 242/348.4; 242/588.5; 242/594.3
[58] Field of Search .......... 242/348, 348.1, 348.2, 242/348.3, 348.4, 594.3, 538.4, 588.5; 354/275

[56] References Cited

U.S. PATENT DOCUMENTS

| | | | |
|---|---|---|---|
| 1,268,222 | 6/1918 | Dwyer | 242/594.3 |
| 1,593,781 | 7/1926 | See | 242/594.3 |
| 2,978,155 | 4/1961 | Knutson | 242/594.3 |
| 3,104,847 | 9/1963 | Miller | 242/594.3 |
| 3,315,910 | 4/1967 | Galley et al. | |
| 4,024,107 | 8/1977 | Kendig | 206/306 |
| 4,042,185 | 8/1977 | Risse | 242/594.3 |
| 4,597,658 | 7/1986 | Buelens et al. | 354/275 |
| 4,632,326 | 12/1986 | Boote et al. | |
| 4,682,741 | 7/1987 | Honegger | |
| 4,714,210 | 12/1987 | Howell | |
| 4,741,439 | 5/1988 | Bizic | 206/316 |
| 4,760,915 | 8/1988 | Boets et al. | 206/303 |
| 5,053,795 | 10/1991 | Wyman | 354/275 |
| 5,163,556 | 11/1992 | Akao et al. | 206/394 |
| 5,165,542 | 11/1992 | Sommerfeldt et al. | 206/394 |
| 5,193,759 | 3/1993 | Bigelow et al. | 242/588.5 |

*Primary Examiner*—John M. Jillions
*Attorney, Agent, or Firm*—Carl F. Ruoff

[57] ABSTRACT

A package 10 for storing and delivering rolls of photosensitive web (A) to a photoprinter has a housing 12 comprising an interior compartment 14 and a removably mounted shaft 32 for supporting the rolls of web (A). A top wall 24 is removably mounted to the housing 12 in a light-lock relationship and includes a openable member 100 for accessing the interior compartment 14. Slot-like openings 80, in communications with the interior compartment 14, provide paths for delivering strips of photosensitive web 70 from the interior compartment 14. In another embodiment, a method for loading rolls of photosensitive web (A) into the package 10 above includes removing the shaft 32 and loading thereon the rolls of photosensitive web (A). The shaft 32 supporting the rolls of photosensitive web (A) is then inserted into the opening 27 of the housing 12 and the top wall 24 is remounted onto the top edge 25 of housing 12.

9 Claims, 12 Drawing Sheets

PACKAGE FOR ROLLS OF PHOTOSENSITIVE WEB

FIELD OF THE INVENTION

The invention relates to the packaging of rolls of web. More particularly, the invention concerns packages and a method for storing and delivering multiple rolls of photosensitive web having very great lengths.

BACKGROUND OF THE INVENTION

Photoprinters adapted to receive rolls of photosensitive web directly from an external supply generally require mateable packages capable of providing several fairly lengthy rolls of photosensitive web to the system for continuous high volume printing. An existing package system described in U.S. patent application, Ser. No. 952,897, filed Nov. 20, 1992, and based on priority French application No. 9000007375 filed Jun. 8, 1990 can accommodate eight 6000 foot rolls of photosensitive web at a time. Moreover, the existing package is designed to be end loaded from a slitter by the photographic paper manufacturer, closed and then shipped loaded to the photofinisher. When the photographic paper supply is exhausted, the photofinisher must return the empty package to the photographic paper manufacturer for reloading.

Shortcomings of the existing package therefore include its inability to accommodate more lengthy rolls of photosensitive web as well as a greater number of rolls of web. Thus, photoprinter system uptime is at least partially adversely affected by the limited capacity of the existing package. Moreover, another problem with the existing package is that it cannot be conveniently loaded by the photofinisher and, therefore, must be returned to the photographic paper manufacturer for reloading. Additionally, to withstand the rigors of transportation, the existing package must be of rugged construction. Further, the prior art package is limited to a substantially cylindrical shape to minimize condensation damage to the photosensitive rolls of web resulting from differing temperatures during shipment. Since relative humidity is an important factor in maintaining the quality of photosensitive web, the cylindrical shaped existing package provides a path for condensation to roll down the side walls of the package and not drip on the photosensitive web. Importantly conventional packages for rolls of photosensitive web are limited in their capacity to hold large rolls of web (i.e., very much greater than 6000 feet). Moreover, because the existing package rests on a pallet at the photofinisher's for the convenience of the shipping process, it cannot be easily maneuvered by the photofinisher without the aid of a lift device, such as a fork lift.

Although only remotely pertinent, packages for individual photosensitive web rolls fitted with a light-tight slot through which the roll is pulled out are known. These packages, called magazines, are described, for example, in the U.S. Pat. Nos. 4,741,439 or 3,315,910. Magazines allow easy use of photographic printing machines since they do not require a dark room environment. However, due to the weight which has to be reasonable in order to permit easy handling, the rolls have a limited length and the magazines must be often replaced.

Therefore, a persistent need exists for a package for photosensitive rolls of web for photoprinters that is convenient to use, of simple construction, maneuverable, economical to manufacture, easily loaded by the photofinisher, and has greater capacity to contain more lengthy and greater number rolls of photosensitive web.

SUMMARY OF THE INVENTION

It is, therefore, an object of the invention to provide a package and method that overcome the problems of the prior art. Accordingly, for accomplishing these and other objects of the invention, there is provided, in one aspect of the invention, a package for storing and delivering rolls of photosensitive web to a photoprinter comprising a housing having an interior compartment. The interior compartment includes a bottom wall and upstanding first and second opposed end walls and sidewalls. The first and second end walls and sidewalls define a top edge surrounding an opening exposing the interior compartment. A shaft is positionable in the interior compartment through the opening for supporting at least one roll of photosensitive web. The shaft is removably mounted to the first and second opposite end walls. A top wall, having an openable member for accessing the interior compartment, is removably mounted to the top edge of the housing in a light relationship. In the preferred embodiment, a continuous channel in the top edge of the housing for receiving a lip portion of the top wall provides a light lock. Moreover, slot-like openings are provided in communication with the interior compartment, each of the slot-like opening providing a light-tight path for delivering a strip of photosensitive web from the interior compartment.

In another aspect of the invention, a method for loading photosensitive rolls of web into the package described above comprises removing the top wall from the housing and then the shaft from the interior compartment. The photosensitive web rolls are then mounted on the shaft and the shaft having the rolls thereon is inserted into the interior compartment. The top wall is mounted onto the housing in a light lock relationship.

BRIEF DESCRIPTION OF THE DRAWINGS

The foregoing as well as other objects, features and advantages of this invention will become more apparent from the appended figures wherein like reference numerals denote like elements, and wherein.

DETAILED DESCRIPTION OF THE INVENTION

Figure 1:
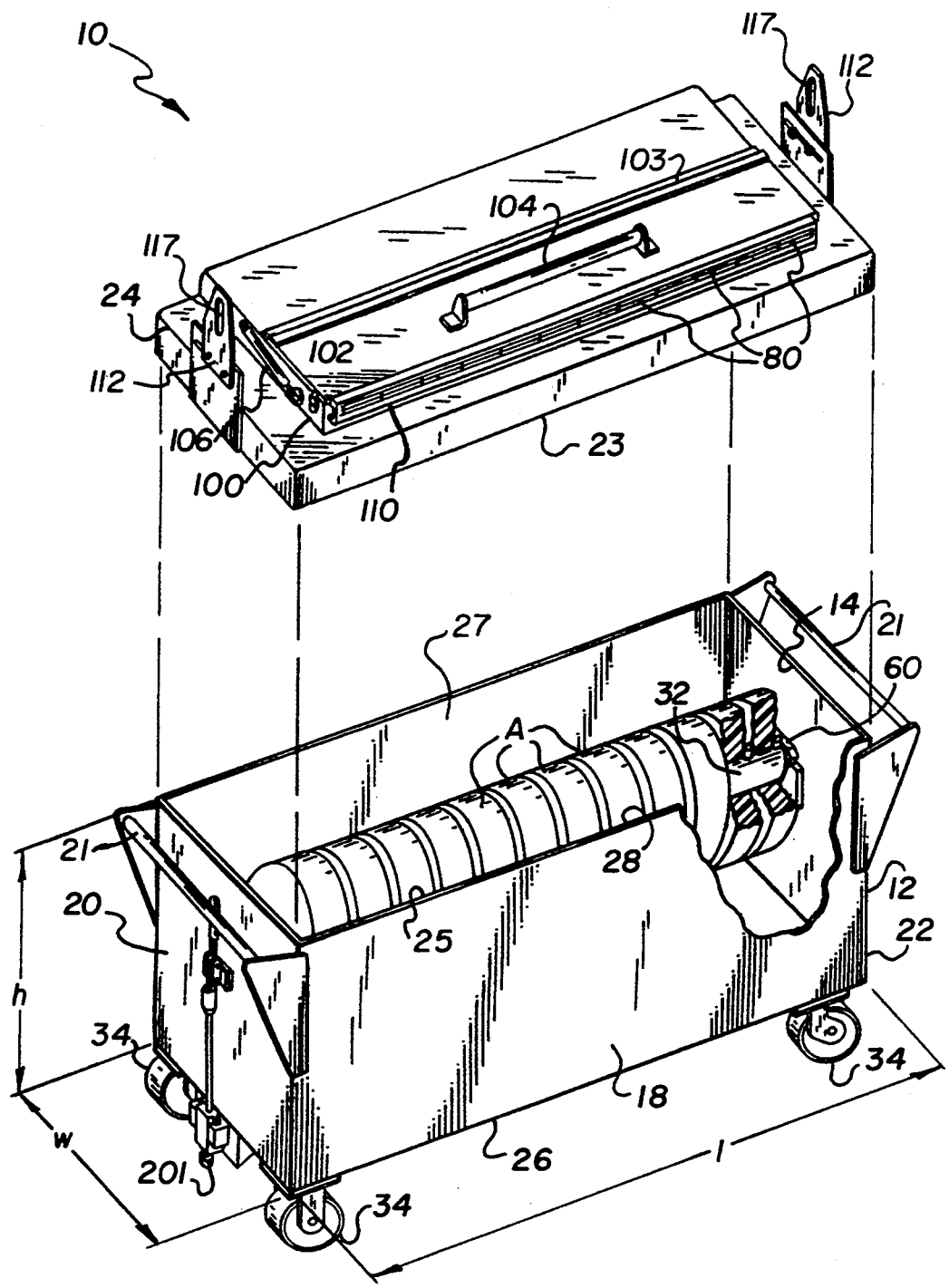
FIG. 1 is an exploded perspective view of the package constructed in accordance with the invention with a sidewall partially broken away to expose rolls of web.
Figure 2:
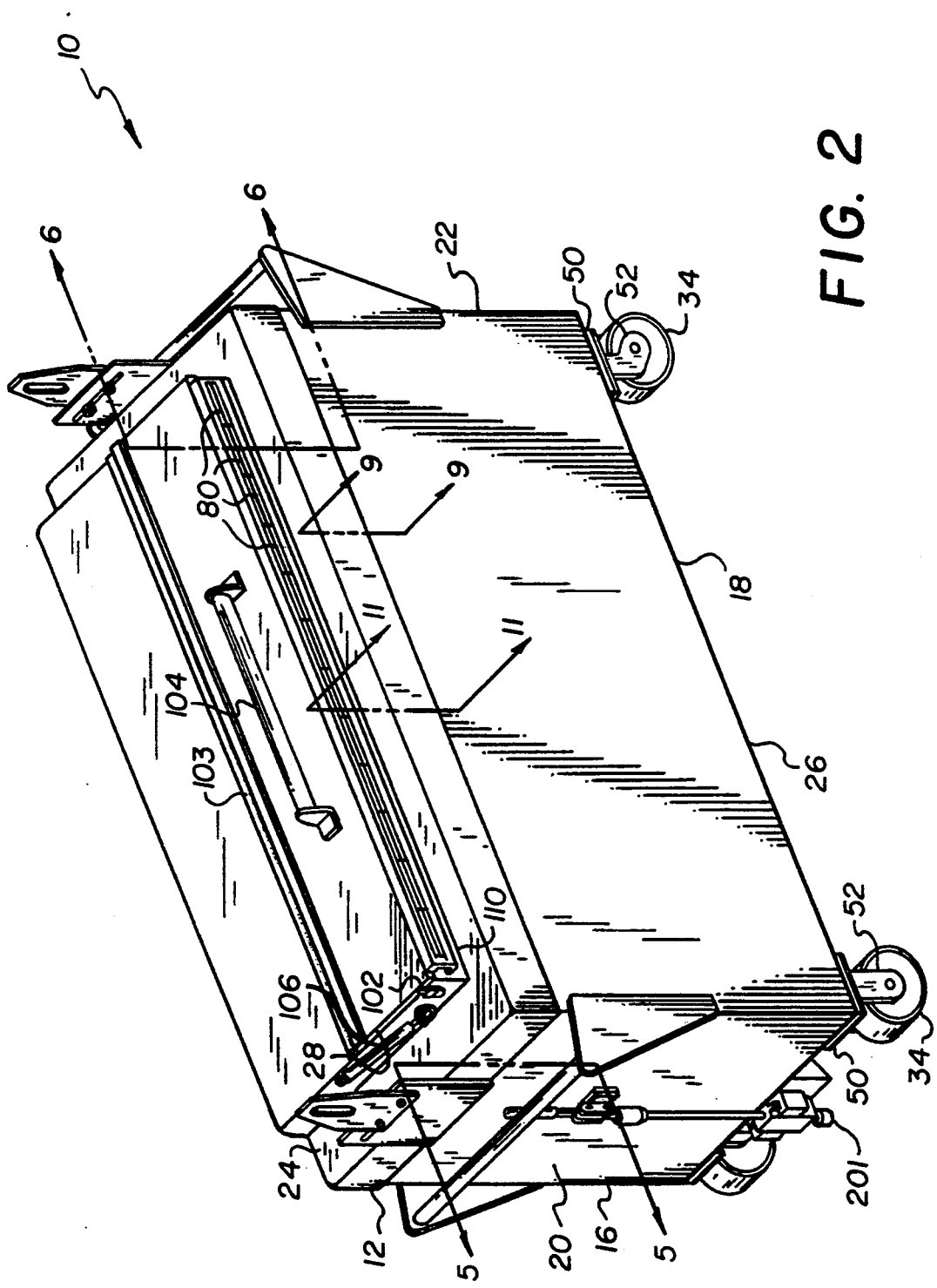
FIG. 2 is a perspective view of the package.

Turning now to the drawings, and more particularly to FIGS. 1-2, there is shown package 10 constructed in accordance with the principles of the invention. Broadly defined, package 10 comprises housing 12, preferably made of steel or other rigid material such as fiber glass or aluminum, having an interior compartment 14. Housing 12 has first and second sidewalls 16,18, first and second end walls 20,22, a bottom wall 26, and a removably mounted top wall 24, the top wall 24 being described in greater details below. According to FIG. 1, first and second end walls 20,22 and sidewalls 16,18 define a top edge 25 of housing 12 surrounding an opening 27. Opening 27 provides means to access the interior compartment 14 for inserting or removing rolls of web or for cleaning the interior compartment 14. The top edge 25 has a continuous channel 28 therein for receiving a continuous lip portion 23 of the top wall 24 in an interlocking relationship, as described further below. In the preferred embodiment, package 10 is a rectanguloid having a length (l) of about 70 inches (177.8 cm), a height (h) of about 48 inches (121.9 cm), and a width (w) of about 40 inches (101.6 cm). A shaft 32, positionable in the interior compartment 14, is removably mounted to the end walls 20,22. Shaft 32, described further below, provides support for one or more rolls of photosensitive web (A) wound on a core, such as photographic paper. In this embodiment of the invention, interior compartment 14 and shaft 32 can accomodate rolls of web having a diameter of about 36 inches (91.44 cm) or about 9000 ft. of web.

Figure 4:
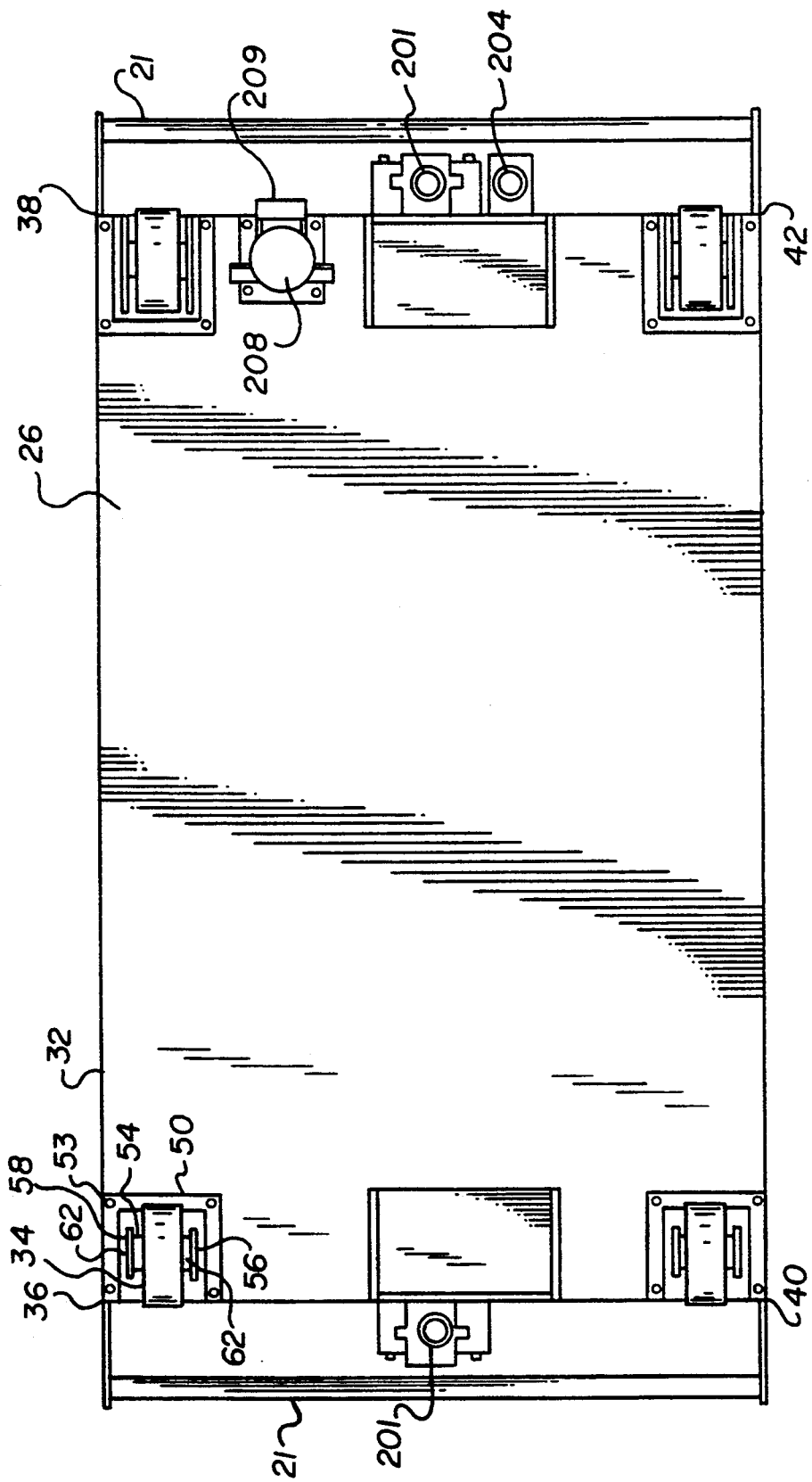
FIG. 4 is a bottom plan view of the package.
Figure 5:
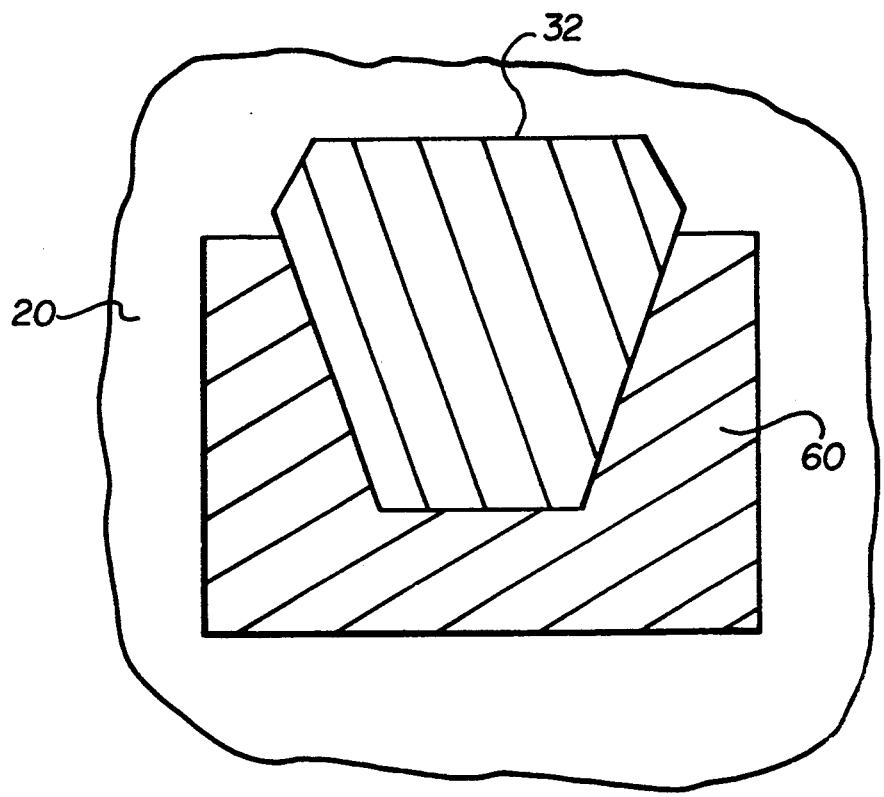
FIG. 5 is a fragmentary sectional view of the first end wall taken along the 5—5 line of FIG. 2.

As indicated in FIGS. 1, 2 & 4, the bottom wall 26, supporting upstanding first and second sidewalls 16,18 and first and second end walls 20,22, is substantially flat and comprises a brake 208 and a caster 34 mounted for rotation on each of the exterior corners 36,38,40,42 thereof. Brake 208 has a rubber-like stopper that engages the floor when urged by paddle 209 and is used to prevent movement of the package 10 when not in use; and, it can also be used when the package 10 is positioned at one of several predetermined photographic paper delivery positions, as described below. According to FIG. 4, mounting plates 50 affixed to the bottom wall 26 by, for instance, bolts 53, or they may be welded, provide a rigid and level surface to which to mount the caster support member 52. Caster support member 52 comprising spaced opposing first and second wall portions 56,58, is attached to the mounting plate 50 by screws or any suitable means. Casters 34 are rotatably mounted on rod members 54. Rod members 54 are supported in first and second wall portions 56,58 of caster support members 52. Hub members 62 are mounted on either end of the rod member 54 to ensure that the casters 34 do not separate from the rod members 54.

Figure 3:
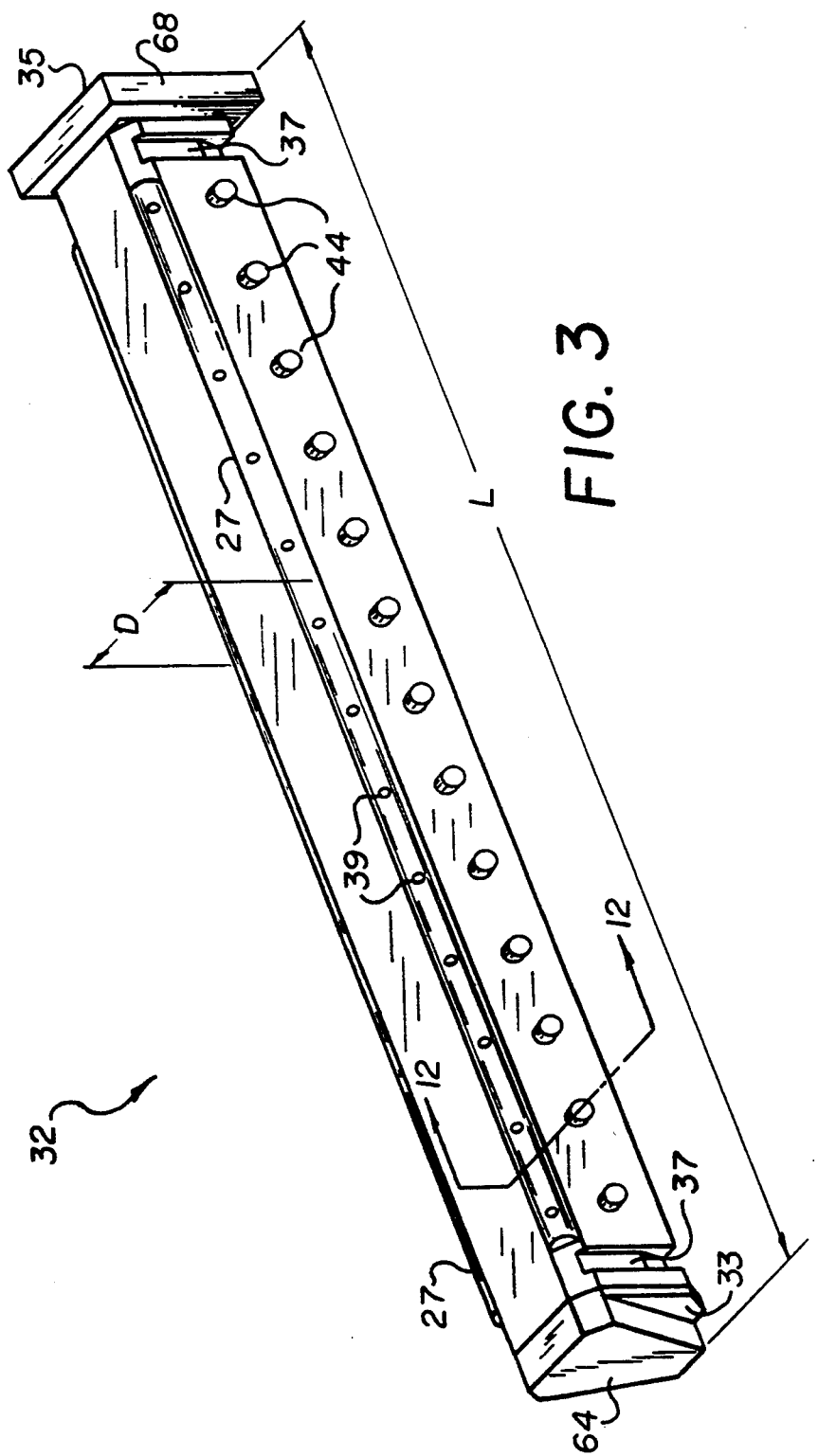
FIG. 3 is a perspective view of the shaft of the invention.
Figure 6:
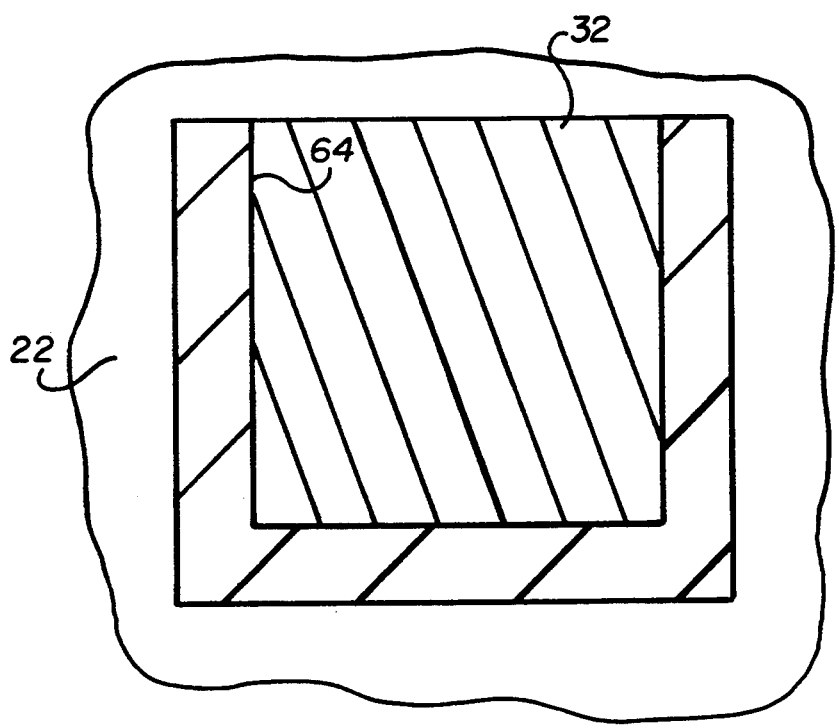
FIG. 6 is a fragmentary sectional view of the second end wall taken along the 6—6 line of FIG. 2.
Figure 7:
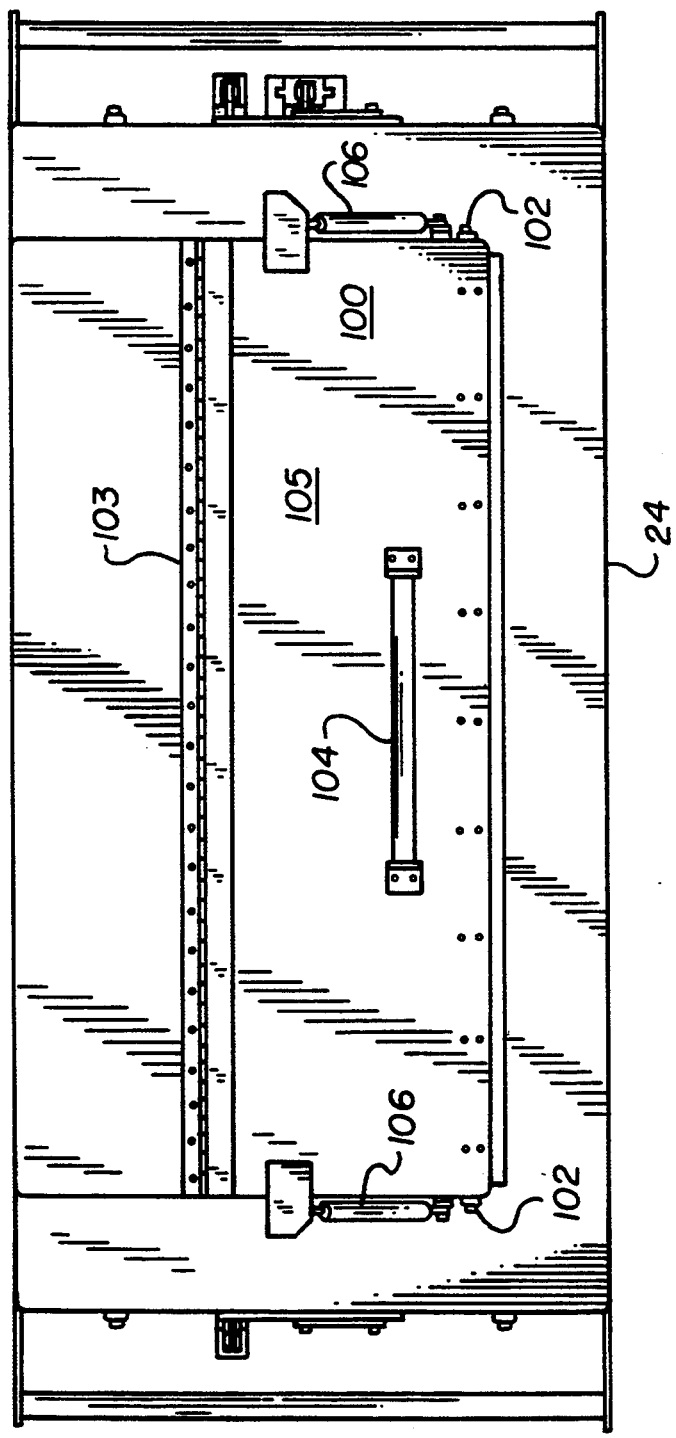
FIG. 7 is a top plan view of the top wall showing the openable member in a closed position.

In FIGS. 1-3, 5 & 6, shaft 32, made preferably of steel or other suitable rigid material, such as aluminum, is a substantially smooth elongated surface having a length (L) of about 60 inches (162.6 cm) and a diameter (D) of about 6 inches (15.2 cm) so as to receive the rolls of web mounted thereon. As shown clearly in FIGS. 3 & 5, one end portion 33 of shaft 32 has attached thereto a substantially V-shaped mounting member 64. In FIGS. 3 & 6, the opposite end portion 35 of shaft 32 has attached thereto a substantially square-shaped mounting member 68. Although welding is the preferred means of attaching mounting members 64,68 to the end portions 33,35, respectively, of shaft 32, other suitable means, such as screws, may be used. Mounting members 64,68 provide means to mount shaft 32 onto end walls 20,22 in interior compartment 14, as described below. Shaft 32 is removed from interior compartment 14 of the housing 12 by first removing the top wall 24 and then securely grasping both end portions of the shaft 32 while raising the shaft 32 upwardly through opening 27 until it clears the top edge 25.

Further, in FIGS. 1 and 2, opposed first and second end walls 20,22 are welded to bottom wall 26 to form the rigid housing 12. To accommodate shaft 32 in the interior compartment 14, each end wall 20,22 has a grooved, correspondingly aligned, plate-like member 60 or 66 affixed thereto conformed to receive an end portion 33,35 of shaft 32. According to FIG. 5, plate-like member 60 has a substantially V-shaped groove slightly larger than corresponding mounting member 64 of shaft 32. In FIG. 6, opposed second end wall 24 is provided with plate-like member 66 having a substantially square shaped groove slightly larger than corresponding mounting member 68 of shaft 32. The slightly oversized grooves in plate-like members 60,66 enable the shaft 32 to fit easily but securely in the grooves thereby facilitating shaft 32 removal and installation. Skilled artisans will appreciate that there are alternative ways within the contemplation of the invention for supporting shaft 32, such as, providing the groove portions described above in the opposing end walls 20,22.

As depicted in FIGS. 1, 2, 7 & 8, top wall 24 has an openable member 100 connected by a hinge 103, or similar attachment means, to the top rearward portion 101 of top wall 24. Openable member 100 includes a handle 104 mounted preferably to a top forward portion 105 of member 100 and, a pair of gas springs 106, one each being cooperatively mounted to top wall 24 and to openable member 100. The gas springs 106 counter-balance the weight of the openable member 100 for easily raising and lowering the openable member 100 to an open and then closed position. In the open position (FIG. 8), the operator can access the interior compartment 14 to, for instance, check the supply of rolls, clean the interior, clear a feed through problem etc. Since the rolls of photosensitive web are sensitive to light, openable member 100 should only be accessed when the housing is in a dark room environment (except for cleaning). Advantageously, the openable member 100 can be held in open position by simply raising the member 100. The openable member 100 can be raised when the latches 102 are disengaged. According to FIGS. 1 & 2, slot like openings 80, described more fully below, are mounted on a front edge portion 110 of openable member 100.

Figure 11:
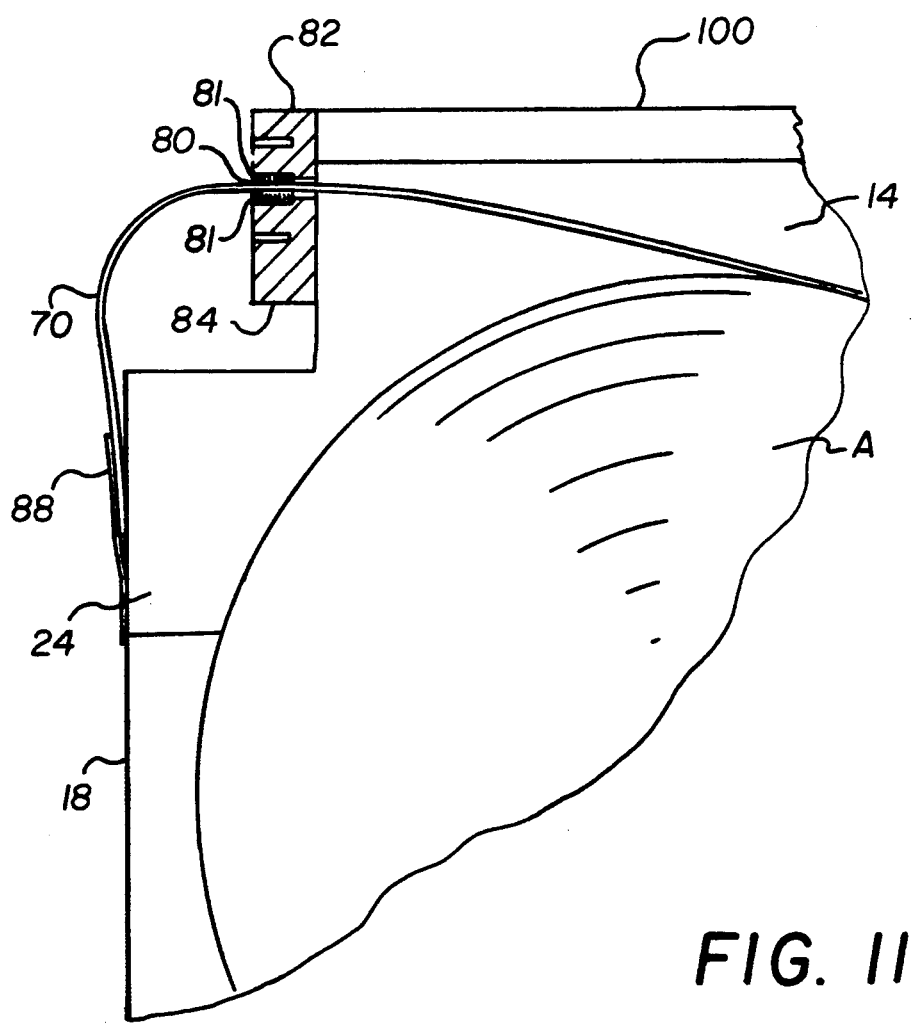
FIG. 11 is a section view of slot-like opening taken along the 11-11 line of FIG. 2.

Further, as illustrated in FIGS. 1,2,6, 10 & 11, package 10 is provided with a plurality of contiguous light-tight slot-like openings 80 which allow strips of web 70 or photographic paper to be pulled out of the interior compartment 14 of housing 12. In the preferred embodiment, twelve contiguous slot-like openings 80 are positioned in the front edge portion 110 of the top wall 24. Skilled artisans can appreciate that slot-like openings 80 may alternatively be positioned, for instance, in sidewall 18 (not shown). According to FIG. 8, slot like openings 80 are defined by corresponding upper and lower half-slot portions 82,84. Upper and lower half-slot portions 82,84 form a light-locked path for photographic paper strips exiting the interior compartment 14 (FIG. 11). In the embodiment represented, the upper half-slot portion 82, which delineates a portion of the slot-like opening 80, is attached to openable member 100. Owing to this, the rolls of web (A) arranged on the shaft 32 are easily accessed by tilting open openable member 100, as described in more details below. It is obvious that this operation is performed during the photographic paper loading process in a fully dark room, as indicated above, so as not to fog the photosensitive product.

Figure 8:
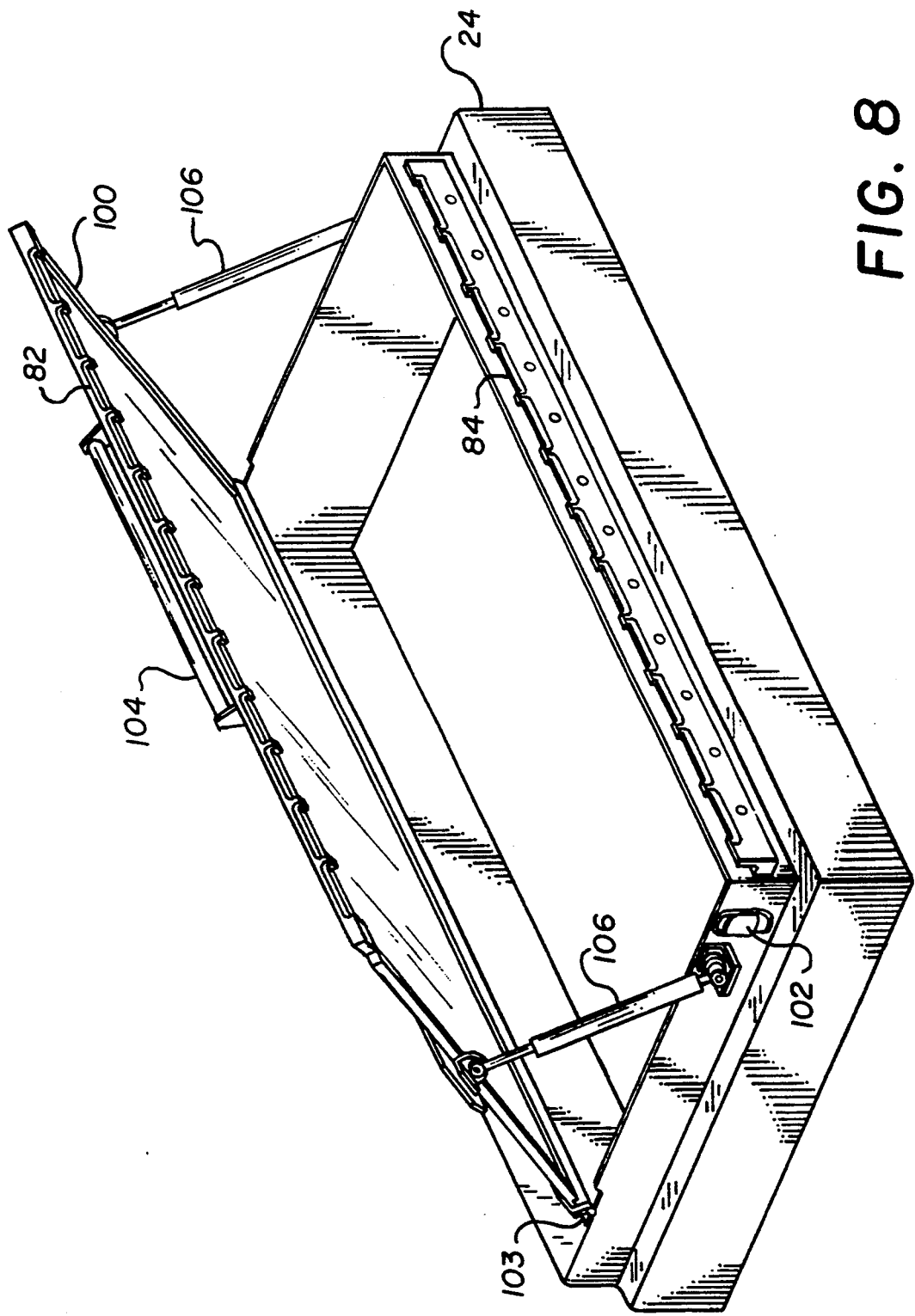
FIG. 8 is a perspective view of the top wall removed showing the openable member in an open position.
Figure 9:
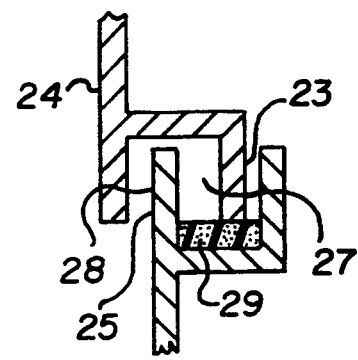
FIG. 9 is a fragmentary section of the light locking features viewed along the 9—9 line of FIG. 2.
Figure 10:
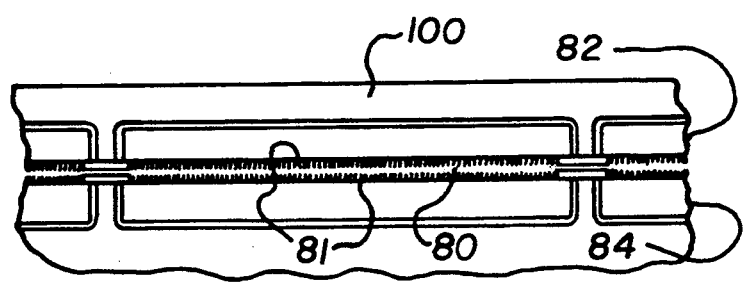
FIG. 10 is a front partial elevation view of a slot-like opening.

In the photographic paper loading operation, slot-like openings 80, in communication with interior compartment 14, are opened to expose the rolls of web (A) by tilting upwardly the upper half-slot portion 82 using handle 104. With the openable member 100 in the open position, as shown in FIG. 8, a strip of web 70 is pulled from one of several rolls of web (A) and the strip 70 adhesively bonded to sidewall 18 of housing 12 (FIG. 11). This operation is repeated for all the rolls of web (A) set on the shaft 32; then, the openable member 100 is closed thereby bringing upper half-slot portion 82 and lower half slot-like member 84 into a tightly closed relations forming slot-like openings 80. In FIG. 11, for illustrative purposes only, web strip 70 is shown emerging through a slot-like opening 80 and fastened onto sidewall 24 by means of an adhesive tape 88. Alternatively, a clip (not shown) or similar attachment means may also be used for securing the web strip 70. It is obvious that the hinge 103 and the upper half-slot portion 82 which delineate the slot-like openings 80 are fitted with light locking material, described below, similar to that described French patent application 9001858 already cited.

The tightness between the upper half-slot portion 82 and the lower half-slot portion 84, cooperating to form the slot-like openings 80, is improved due to the application of a foam-like material layer 81 (FIG. 11). Preferably, a jersey foam compound sold by Etablissements Gergonne in Oyonnax, France, is applied to the upper and lower half slot portions 82,84. Of course, other materials, such as felt, may also be used to improve tightness between the upper half-slot and lower half-slot portions 82,84.

In another aspect of the invention, a method for loading rolls of web (A) into package 10, described above, includes first removing the top wall 24 from the housing 12. Free access to the interior compartment 14 and the shaft 32 therein which supports the rolls of web (A) is provided in this manner. Practically any means for removing top wall 24 may be used although hoisting the top wall 24 away from the housing 12 is preferred. In the preferred embodiment, lift support members 112 comprising elongated slot portions 117 extending above the top surface of openable member 100 are welded to opposing ends 113,115 of top wall 24. A hoist device (not shown), preferably including hooks for graspably engaging elongated slot portions 117 of lift support members 112 is used to remove and to mount top wall 24. The rolls of photosensitive web (A) are then loaded onto the shaft 32 one at a time until the shaft 32 is at least partially loaded. Preferably, the shaft 32 is loaded by inserting it into the rolls of web (A) when the rolls are placed in a horizontal position (not illustrated). According to FIGS. 12–14, to prevent interference between adjacent rolls of web (A) mounted on the shaft 32, spacers 44 (described below) are mounted along the shaft 32 at predetermined distances.

Figure 12:
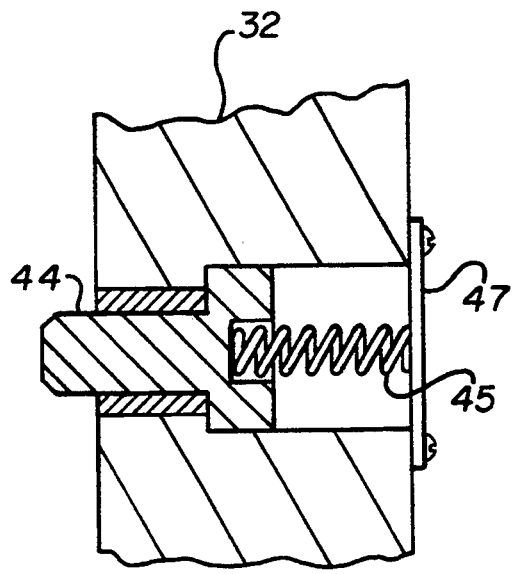
FIG. 12 is a partial enlarged section view along the 12—12 line of FIG. 3 showing retractable pin spacer member.
Figure 14:
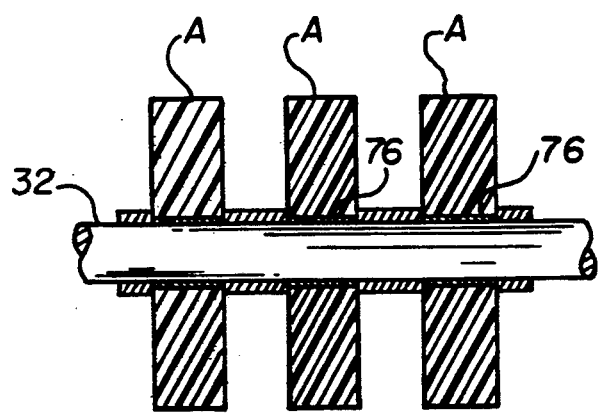
FIG. 14 is another alternative roll spacer embodiment.
Figure 13:
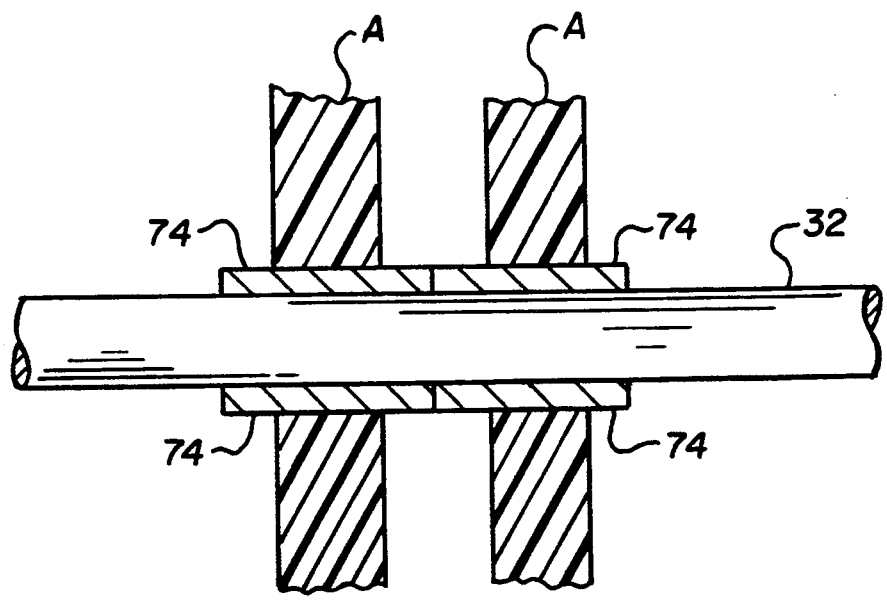
FIG. 13 is an alternative roll spacer embodiment.

In FIGS. 3 and 13, a plurality of retractable pin-like members 44 comprising a spring member 45 biased against support plate 47 are mounted in shaft 32. When a roll of photographic paper having core diameter slightly greater than the diameter of shaft 32 contacts the pin-like member 44, the pin-like member 44 retracts and enables the roll of web (A) to locate to a preferred position along the shaft 32 between adjacent pin-like members 44, as best seen in FIG. 13. Alternatively, as shown in FIGS. 12 and 14, oversized core spacers 74 (i.e., wherein the spacer width is greater than the width of the paper core) or an undersized paper core 76 (i.e., wherein the spacer width is less than the width of the paper core), respectively, could be used to restrict the lateral movement of adjacent rolls of web along the shaft 32. In either case, the diameter of the spacer must be less than the diameter of the paper core to ensure that unwinding of the last convolution of paper on the core is not impeded.

In the preferred shaft loading operation, one end of the shaft 32 is supported by a hoist or similar device and the free end is then inserted through pre-packaged cores of photographic paper (not shown). Once loaded, the shaft 32 supporting one or more rolls of web (A) is then hoisted into position for insertion into the interior compartment 14 of the housing 12. In the preferred embodiment, grooves 37 (FIG. 3) are provided on either end portion 33,35 of shaft 32 to receive J-hook members used in conjunction with the hoist for ensuring a stable and secure transportation of shaft 32. Mounting members 64,68 of shaft 32 are then inserted into a locking relations with the corresponding V-shaped groove and square groove of plate-like members 23,25 attached to end walls 20,22, as described previously. Once the shaft 32 having rolls of web (A) mounted thereon is loaded into interior compartment 14, top wall 24 is then mounted onto the top edge 25 of housing 12 in a light-lock relations. Lip portion 23 of top wall 24 is carefully snugly inserted into the continuous channel 28 surrounding opening 27. In the preferred embodiment, a compressible material layer 29, such as closed cell neoprene, is lined along the channel 28 thereby providing additional barrier against light leakage. Once the top wall 24 is installed, the package 10 is ready for use, for example in conjunction with a photoprinter.

Figure 15:
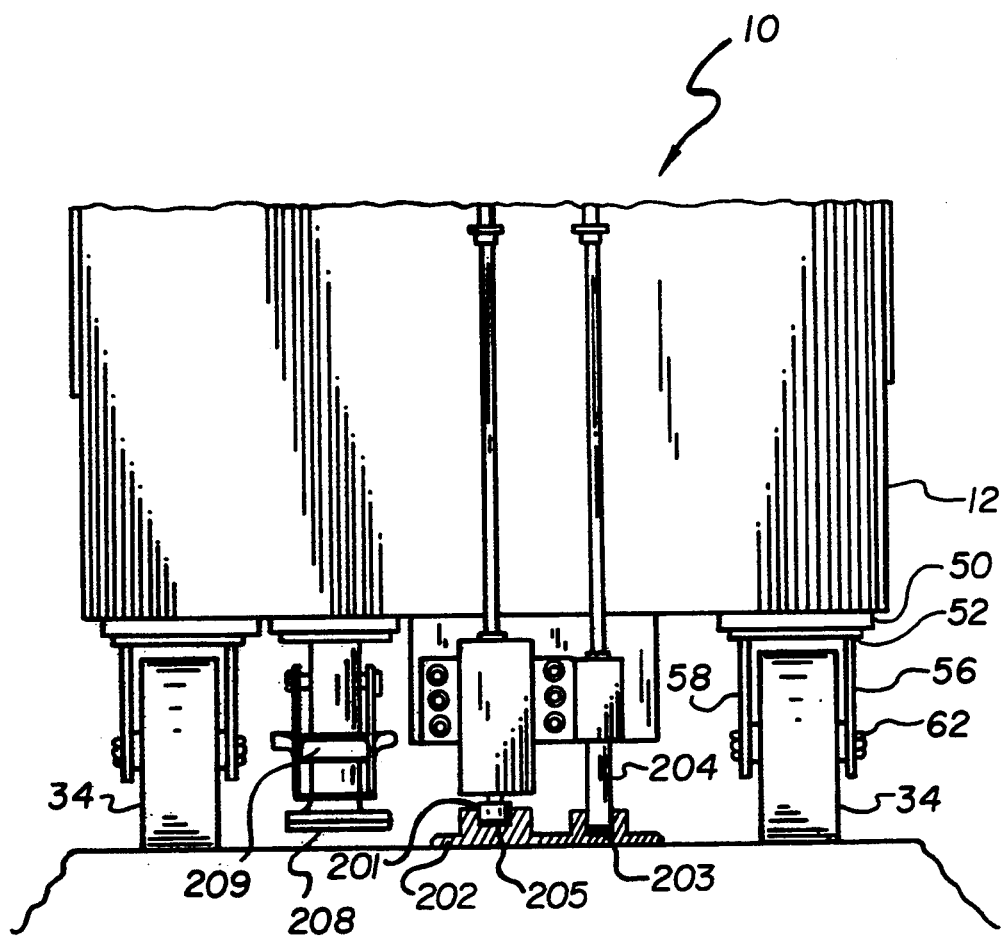
FIG. 15 is a fragmentary front view of the track/-guidance system of the invention.

To use the package 10 of the invention, the package 10 is preferably located in juxtaposition with a photoprinter (not shown) adapted to receive photographic paper from an external supply. For the convenience of the operator, handles 21 (FIGS. 1,2,4, & 7) mounted to the exterior of either end wall 20,22 provide a convenient means to push or pull the package into position. In FIG. 15, package 10 is positionable along a predetermined path, such as a guide track 202 mounted to the floor. Guide track 202 comprises a continuous grooved portion 205 for receiving cam follower 201 affixed to and extending downwardly from the bottom portion 72 of end wall 20 of housing 12. Guide track 202 enables the user to manipulate the location of package 10 relative to the photoprinter and it facilitates the photographic paper loading process. Retractable locating pin 204 extending downwardly from the bottom portion 72 of end wall 20 and adjacent to the cam follower 201 is insertable into one of a plurality of holes 203, each hole 203 corresponding to a predetermined photographic paper delivery position. A photographic paper delivery position is defined by the alignment of a slot-like opening 80 with a utilization device, such as a buffer or photoprinter (not shown). Once the package 10 is in the desired position along guide track 202, the web strip 70, adhesively attached to front edge 110 or sidewall 18 of housing 12 (as described above), is then inserted into a photographic paper interface device, for example a buffer (not shown), for transporting the photographic paper to a photoprinter. The aforementioned device can then be aligned with the slot-like openings 80 of package 10.

Once a roll of web (A) is exhausted, the package 10 is then advanced to a preselected second roll delivery position along guide track 202. As before, the package 10 is guided by means of cam follower 201 moving along in groove portion 205. Precise location of package 10 for photographic paper delivery is achieved by means of locating pin 204 and mateable hole 203 in track 202. As should be obvious, locating holes 203 in the track 202 are spaced to correspond to the spacing of the photographic webs on the shaft 32.

Hence, the process for locating the photographic webs for use by the photoprinter is as follows: after a photographic web has been consumed, the locating pin member 204 is retracted from the mateable hole 203. The package 10 is then manually moved to the next locating pin member 204 location corresponding to the next preselected photographic paper delivery position and the locating pin member 204 is then inserted into the corresponding mateable hole 203. This operation continues until all the rolls of web (A) supported by shaft 32 are consumed.

Accordingly, an important advantage of the present invention is that it provides a package for photosensitive rolls of web (A) for photoprinters that is convenient to use, of simple construction, maneuverable, economical to manufacture, easily loaded by the photofinisher, and has greater capacity to contain more lengthy and greater number rolls of photosensitive web.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes for exemplification, but is to be limited only by the scope of the attached claim or claims, including the full range of equivalency to which each element thereof is entitled.

What is claimed is:

1. Package for storing photosensitive web and delivering the web to a photoprinter, the package comprising:
    a housing comprising an interior compartment having a bottom wall supporting upstanding first and second opposed end walls and sidewalls, said first and second end walls and sidewalls defining a top edge surrounding an opening;
    a plurality of casters mounted for rotation for positioning said housing;
    a shaft positionable in said interior compartment through said opening for supporting at least one roll of photosensitive web, said shaft being removably mounted to said first and second opposite end walls;
    a top wall removably mounted to said top edge of said housing, said top wall having an openable member for accessing the interior compartment;
    means for light-locking said housing; and,
    slot-like openings in communication with the interior compartment, each said slot-like opening providing a path for delivering a strip of photosensitive web from said interior compartment to a photoprinter.

2. The package recited in claim 1 wherein said top edge comprises a continuous channel and said light locking means comprises a continuous lip portion of said top wall snugly fitted into said continuous channel, said channel being lined with a compressible material.

3. The package recited in claim 1 wherein said first and second opposed end walls are provided with first and second plate-like members, said first and second plate-like members having a first and second grooved portions, respectively, for supporting end portion of said shaft, said grooved portions each being conformed to receive one of said end portions.

4. The package recited in claim 3 wherein said first grooved portion is substantially rectangular-shaped.

5. The package recited in claim 4 wherein said second grooved portion is substantially V-shaped.

6. The package recited in claim 1 wherein means are provided for spatially separating two or more rolls of photosensitive web on said shaft so as to resist damaging adjacent photosensitive rolls of web.

7. The package recited in claim 6 wherein said separating means comprises spaced apart pin-like members retractably mounted in said shaft.

8. The package recited in claim 1 wherein said housing is further provided with means for positioning one of said slot-like openings at a time for delivering a strip of photosensitive web.

9. The package recited in claim 8 wherein said positioning means comprise a retractable locating pin member affixed to said housing and a guide track, said guide track having a plurality of mateable holes for receiving said locating pin member, each mateable hole corresponding to a photosensitive web delivery position.

* * * * *